United States Patent
Noguchi et al.

(10) Patent No.: US 7,142,373 B2
(45) Date of Patent: Nov. 28, 2006

(54) LENS BARREL ASSEMBLY HAVING OUTER AND INNER BARRELS

(75) Inventors: Yukio Noguchi, Saitama (JP); Takashi Suzuki, Saitama (JP); Takehiko Senba, Saitama (JP)

(73) Assignees: Fujinon Corporation, Saitama (JP); Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/393,707

(22) Filed: Mar. 31, 2006

(65) Prior Publication Data

US 2006/0221465 A1 Oct. 5, 2006

(30) Foreign Application Priority Data

Mar. 31, 2005 (JP) .............................. 2005-104018

(51) Int. Cl.
*G02B 15/14* (2006.01)
(52) U.S. Cl. ..................................... 359/694
(58) Field of Classification Search ............... 359/694, 359/702–704, 811, 813, 819, 821, 822, 823, 359/826

See application file for complete search history.

(56) References Cited

U.S. PATENT DOCUMENTS 6,115,189 A * 9/2000 Nomura et al. ............. 359/694
7,012,760 B1 * 3/2006 Matsushima et al. ....... 359/699

FOREIGN PATENT DOCUMENTS

| JP | 3-62330 U | 6/1991 |
| JP | 9-197527 A | 7/1997 |
| JP | 11-327018 | 11/1999 |

* cited by examiner

*Primary Examiner*—Mohammad A Hasan
(74) *Attorney, Agent, or Firm*—Sughrue Mion, PLLC

(57) ABSTRACT

A lens barrel assembly for use with a digital still camera includes an outer barrel having a front end and a rear end. An inner barrel is inserted in the outer barrel in an optical axis direction. The outer barrel moves forwards relative to the inner barrel, to shift between a short size position and a long size position, and when in the short size position, shifts from the inner barrel at a smallest shifting amount, and when in the long size position, shifts from the inner barrel at a largest shifting amount. A vent is formed in the outer barrel, and disposed close to the front end. A filter is water-impermeable and air-permeable, and secured to the vent in a closed manner. Also, a vent cover is secured to the outer barrel, for covering the vent.

14 Claims, 5 Drawing Sheets

LENS BARREL ASSEMBLY HAVING OUTER AND INNER BARRELS

BACKGROUND OF THE INVENTION

1. Field of the Invention

The present invention relates to a lens barrel assembly having outer and inner barrels. More particularly, the present invention relates to a lens barrel assembly having outer and inner barrels and having a structure capable of preventing influence of water, droplets, dust or the like.

2. Description Related to the Prior Art

A lens barrel assembly or lens barrel is known in the field of cameras or optical instruments. An example of the lens barrel assembly is a zoom lens barrel of which a body can be extended or shortened. According to the movement, air pressure inside the lens barrel assembly is changed by a change in the inner volume. An cavity formed through the lens barrel assembly causes air to flow in and out.

If a cavity exists in the lens barrel assembly, droplets of water of dust may enter the lens barrel assembly, to mist lens elements or to damage electric parts. A closed state of the lens barrel assembly may be tightened for preventing such problems. However, air in the lens barrel assembly cannot be vented or cannot flow in and out smoothly, so zooming will not be carried out safely. There is a suggested camera in JP-A 9-197527 in which a vent with a waterproof structure is formed in each of the lens barrel assembly and a camera body, so as to cause air to flow into and out of the camera body.

JP-A 11-327018 discloses a camera in which the camera body has the vent, and an air permeable, water impermeable sheet is fitted on the vent on its outer side for the waterproof effect. A water shielding panel with pores is fitted on the vent on its inner side, the pores being smaller than the vent. Also, JP-U 3-062330 discloses a waterproof camera in which the lens barrel assembly is covered by bellows in a watertight manner, and air can flow in and out by opening a valve in the camera body in the course of extending or shortening the lens barrel assembly.

In JP-A 9-197527, the waterproof and dust resistant performance is obtained in the state with an interchangeable lens loaded on the camera body. However, no waterproof and dust resistant performance is obtained if the interchangeable lens is handled individually. Droplets or dust is likely to enter the lens barrel assembly when the interchangeable lens is changed in a bad condition as in a rainy weather, and directly manually in a construction site. In JP-A 11-327018 and JP-U 3-062330, there are disclosed ideas of waterproof and dust resistant performance. However, the camera body is inseparable with the camera body. There is no consideration of prevention of droplets or the like at the time of changing the interchangeable lens.

SUMMARY OF THE INVENTION

In view of the foregoing problems, an object of the present invention is to provide a lens barrel assembly having outer and inner barrels and having a structure capable of preventing influence of water, droplets, dust or the like.

In order to achieve the above and other objects and advantages of this invention, a lens barrel assembly includes an outer barrel having a front end and a rear end. An inner barrel has a front portion and a rear portion, and is inserted in the outer barrel in an optical axis direction. The outer barrel moves forwards or backwards relative to the inner barrel in the optical axis direction, to shift between a short size position and a long size position, and when in the short size position, shifts from the inner barrel at a smallest shifting amount, and when in the long size position, shifts from the inner barrel at a largest shifting amount. A first vent is formed in a selected one of the outer and inner barrels to be positioned in front of a remaining one thereof, and disposed close to the front end or the front portion thereof. A first filter is water-impermeable and air-permeable, and secured to the first vent in a closed manner.

The outer barrel is movable forwards from the inner barrel, and the first vent is formed in the outer barrel, and disposed close to the front end.

Furthermore, a vent cover is secured to the outer barrel, for covering the first vent.

Furthermore, a venting channel is formed to come through a connected face between the vent cover and the outer barrel, for passing air between the first vent and outside.

Furthermore, a rotatable zoom ring is disposed on one portion outside the outer barrel. There is a venting cavity defined between the outer barrel and the zoom ring. A second vent is formed through the outer barrel, and has one end in connection with the venting cavity. A second filter is water-impermeable and air-permeable, and secured to the second vent in a closed manner.

The venting cavity includes a first venting cavity portion in connection with the second vent. A second venting cavity portion is disposed to extend in a direction crosswise to an extending direction of the first venting cavity portion, for passing air between the first venting cavity portion and outside.

Furthermore, a third vent is formed in the inner barrel, and disposed close to the rear portion thereof. A third filter is water-impermeable and air-permeable, and secured to the third vent in a closed manner.

Furthermore, a vent cover is secured to the rear portion of the inner barrel, for covering the third vent.

The vent cover is constituted by an aperture control ring or a mount ring for connection with a camera body.

Furthermore, a compressible sealant element is secured between the outer and inner barrels.

The compressible sealant element is resiliently shiftable between an initial state and a compressed state, wherein the sealant element, when the outer barrel is in at least one of the short size position and the long size position relative to the inner barrel, is shifted to the compressed state between the outer and inner barrels, for tightly closing a gap between the outer and inner barrels, and when the outer barrel is in an intermediate position between the short size position and the long size position relative to the inner barrel, is in the initial state, for allowing relative movement between the outer and inner barrels in the optical axis direction.

The compressible sealant element is in a ring shape.

The inner barrel includes a small diameter section, disposed to extend between the rear portion and the front portion, having a peripheral surface with a first diameter, and associated with the intermediate position. A large diameter section is disposed close to at least one of the rear portion and the front portion, having a peripheral surface with a second diameter larger than the first diameter, associated with at least one of the short size position and the long size position, for compressing the sealant element in contact with the outer barrel.

The inner barrel has a solid state pickup device incorporated therein.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
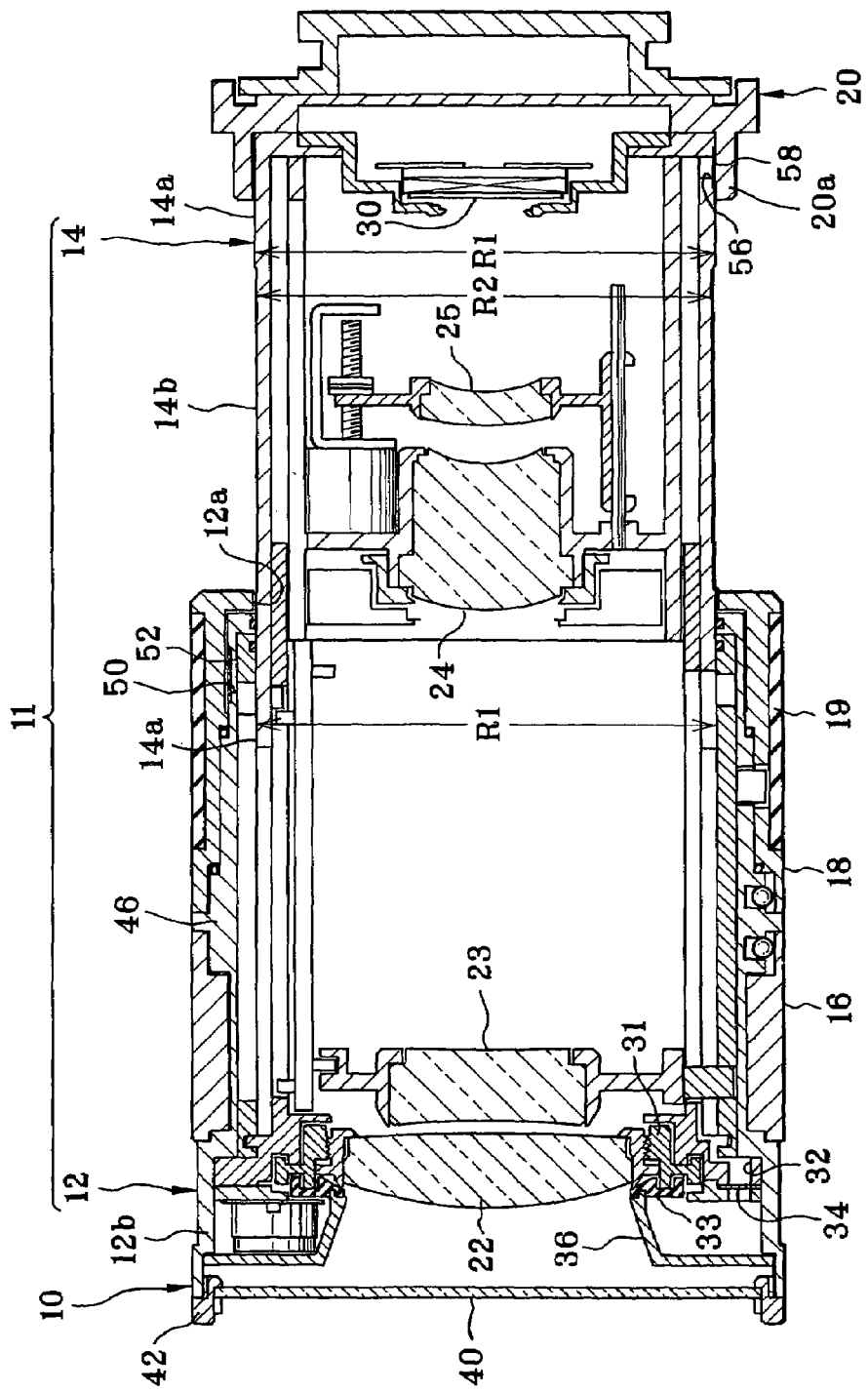
FIG. 1 is a horizontal section illustrating a lens barrel assembly of the invention.
Figure 2:
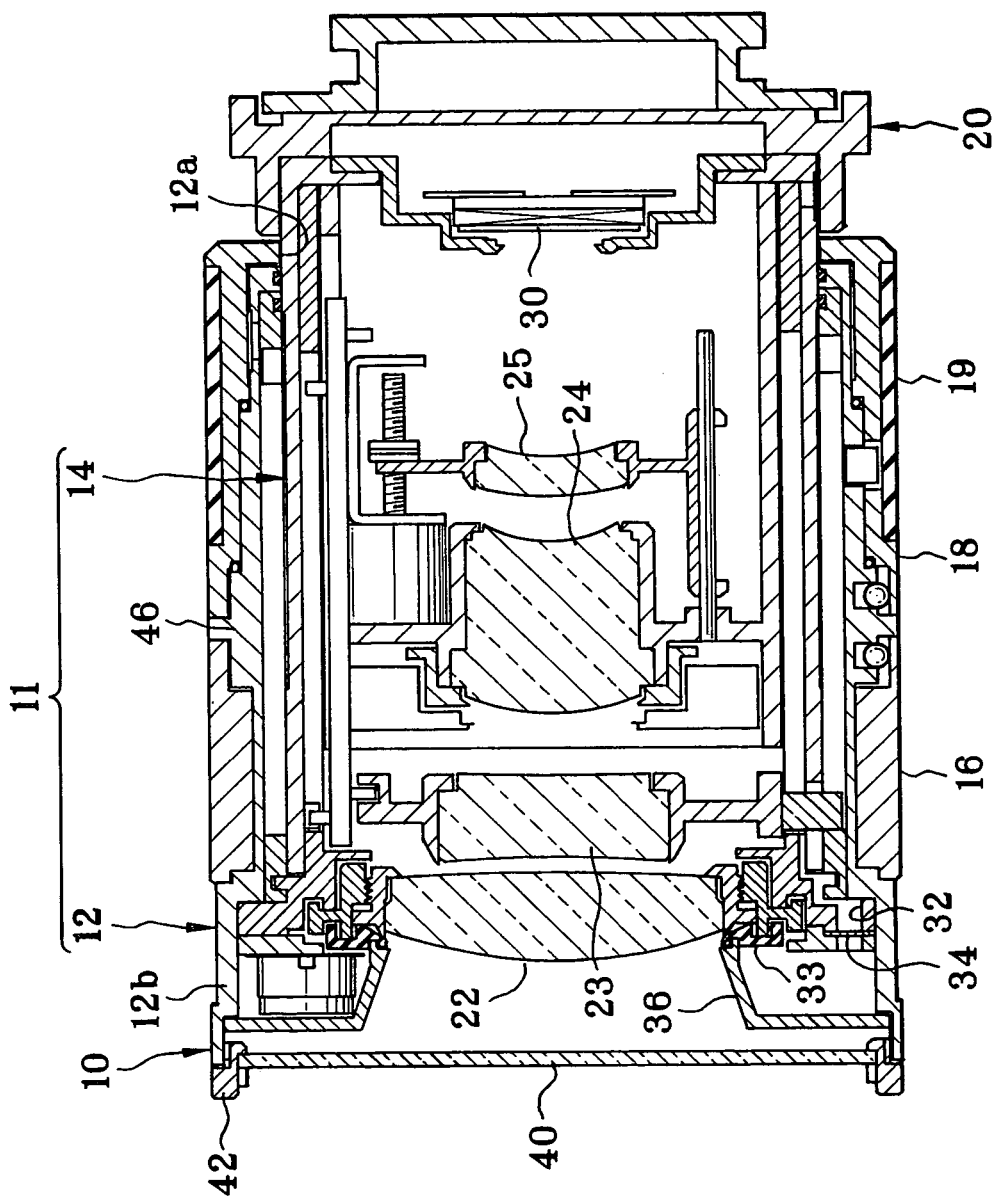
FIG. 2 is a horizontal section illustrating the lens barrel assembly shifted in a short size position.

In FIGS. 1 and 2, a lens barrel assembly 11 of the invention is illustrated. A photographing lens system 10 is a zoom lens system of a two-group structure as an interchangeable lens for being removably loaded on a camera body (not shown). The lens barrel assembly 11 includes an outer barrel 12 and an inner barrel 14 inserted in the outer barrel 12 on an image forming side. A rear end opening 12a is defined in the outer barrel 12 through which the inner barrel 14 moves in and out in an optical axis direction. Note that the inner barrel 14 may be a stationary barrel, on which the outer barrel 12 may be a movable barrel movable on the inner barrel 14.

The lens barrel assembly 11 is telescopically shiftable between a short size position and a long size position. A protruding amount of the inner barrel 14 from the rear end opening 12a of the outer barrel 12, when the lens barrel assembly 11 is in the short size position of FIG. 2, is the smallest, and when the lens barrel assembly 11 is in the long size position in FIG. 1, is the largest. When the lens barrel assembly 11 is in the short size position, no photography is possible because of lack of optically determining a photographing light path in the photographing lens system 10. When the lens barrel assembly 11 is in the long size position, photography is possible because of optically determining a photographing light path in the photographing lens system 10. There is a lock mechanism (not shown) for keeping the outer barrel 12 immovable in the long size position and short size position, so as to prevent accidental offsetting of the inner barrel 14.

The inner barrel 14 is shaped to include two large diameter sections 14a for short and long size positions, and one small diameter section 14b for an intermediate position. The large diameter sections 14a have a diameter R1. The small diameter section 14b has a diameter R2 which is smaller than the diameter R1.

A focusing ring 16 and a zoom ring 18 are disposed outside the outer barrel 12. The focusing ring 16 is rotated for focusing. The zoom ring 18 is rotated for zooming. A ring shaped lens mount 20 or mount ring is disposed on a rear end portion of the inner barrel 14, for coupling the photographing lens system 10 with a camera body in a removable manner. Note that the focusing ring 16 in a normal state is set in the AF setting position in a locked manner, because auto focusing is initially set for photographing in the normal state. A rubber ring 19 is fitted on the peripheral surface of the zoom ring 18, and has a considerable width to provide friction for preventing slip.

The outer barrel 12 contains a first lens group 22 and a variator lens group 23. The first lens group 22 is kept immovable in the outer barrel 12. The variator lens group 23 for zooming is movable forwards and backwards in the optical axis direction. The inner barrel 14 contains a second lens group 24 and a focusing lens group 25. The focusing lens group 25 is movable forwards and backwards in the optical axis direction for the purpose of focusing. A CCD 30 as a solid state pickup device is disposed behind the focusing lens group 25.

Figure 3:
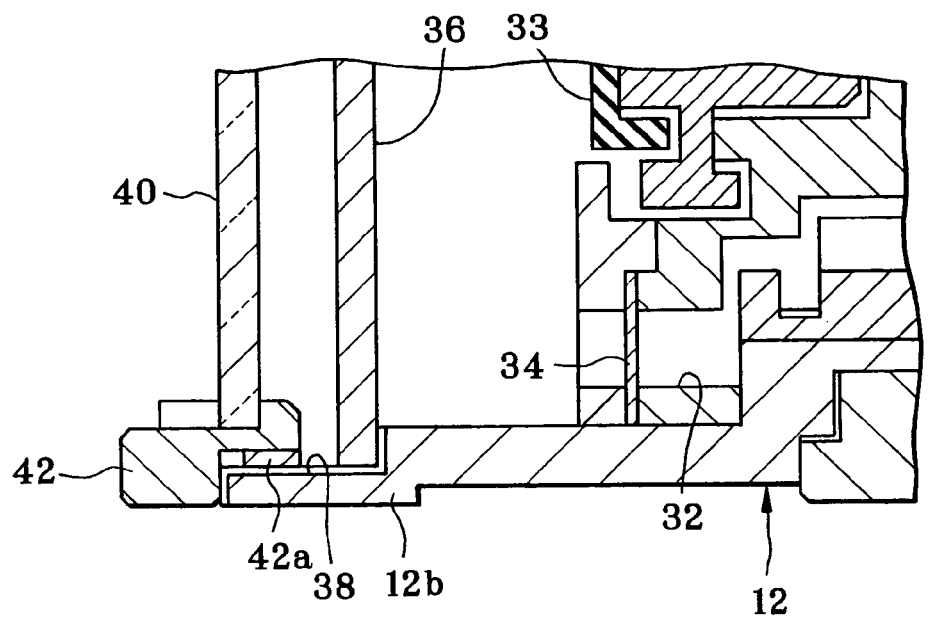
FIG. 3 is a horizontal section, partially broken, illustrating a venting structure at a front end of an outer barrel.

A first vent 32 is formed through a front portion of the outer barrel 12 which contains the first lens group 22. In FIG. 3, a first filter 34 is disposed at the first vent 32 on its outer side, and is formed from material with an air permeable and water impermeable characteristic. Naturally, dust as well as water is prevented from passage. A typical example of material of the first filter 34 is Gore-Tex (trade name) produced by Japan Gore-Tex, Inc., or W. L. Gore & Associates, Inc.

A front ring support end 12b is a front end of the outer barrel 12. A vent cover ring 36 as vent cover is secured to the inside of the front ring support end 12b, and covers the first vent 32. A venting channel 38 is formed in a portion of the front ring support end 12b where an edge of the vent cover ring 36 contacts the same. A protector/filter panel 40 is secured to the front end of the front ring support end 12b, and protects the first lens group 22 in a form of additionally blocking entry of water. A filter support 42 secures the protector/filter panel 40 to the front ring support end 12b. Helical threads are formed on the filter support 42 and the front ring support end 12b for helically engaging with one another. A venting channel 42a is formed in a form of cutting the helical threads of the filter support 42.

While air passes through the first vent 32 or the venting channel 38 or the venting channel 42a, the first filter 34 prevents entry of external particles or material into the lens barrel assembly 11. In FIG. 1, a ring shaped eccentricity adjuster 31 is operable for correcting eccentricity of the first lens group 22. A waterproof dust-resistant gasket or sealant element 33 is disposed between the vent cover ring 36 and the ring shaped eccentricity adjuster 31, and prevents entry of water droplets, dust or the like into the outer barrel 12 through the cavity between the first lens group 22 and the vent cover ring 36.

Figure 4:
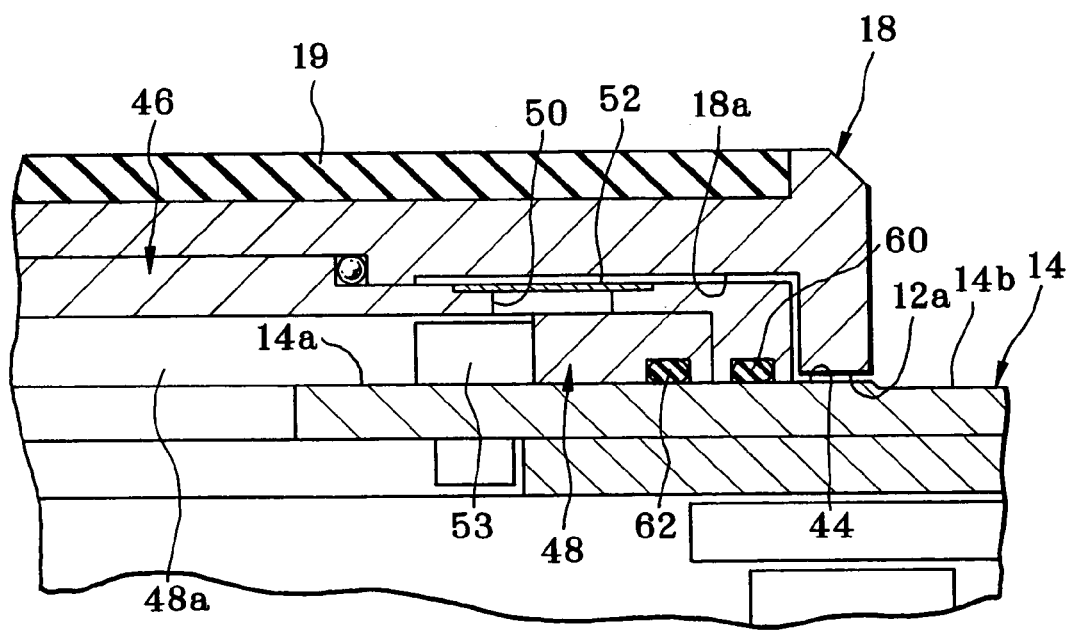
FIG. 4 is a horizontal section, partially broken, illustrating a venting structure close to a rear end opening of the outer barrel.

In FIG. 4, an inner drum or outer barrel body 46 is a main part of the outer barrel 12, and supports the focusing ring 16 and the zoom ring 18. A first venting cavity portion 18a is formed in an inner wall of the zoom ring 18 opposed to the outer barrel body 46. Also, a second venting cavity portion 44 as venting cavity communicates with the first venting cavity portion 18a, and is defined between an edge of the rear end opening 12a of the outer barrel 12 and the large diameter sections 14a of the inner barrel 14, and is a path for discharging air from the inside of the lens barrel assembly 11.

A cam barrel 48 is disposed inside the outer barrel body 46. A regulation cam groove 48a is shaped in the cam barrel 48 so as to extend or shorten the lens barrel assembly 11. There is a second vent 50, formed in the outer barrel body

46, and has a first end in connection with the first venting cavity portion 18*a*, and a second end in connection with the regulation cam groove 48*a*. A second filter 52 is fitted in the second vent 50 in a closed manner, and formed from the material the same as the first filter 34. Thus, no water or dust can enter the inside through the second vent 50. Air can safely flow into and out of the lens barrel assembly 11 smoothly. Note that, in addition to the regulation cam groove 48*a*, a zooming cam groove (not shown) is formed in the cam barrel 48 for converting rotational movement of the zoom ring 18 into movement of the variator lens group 23 in a backward or forward direction.

Figure 5:
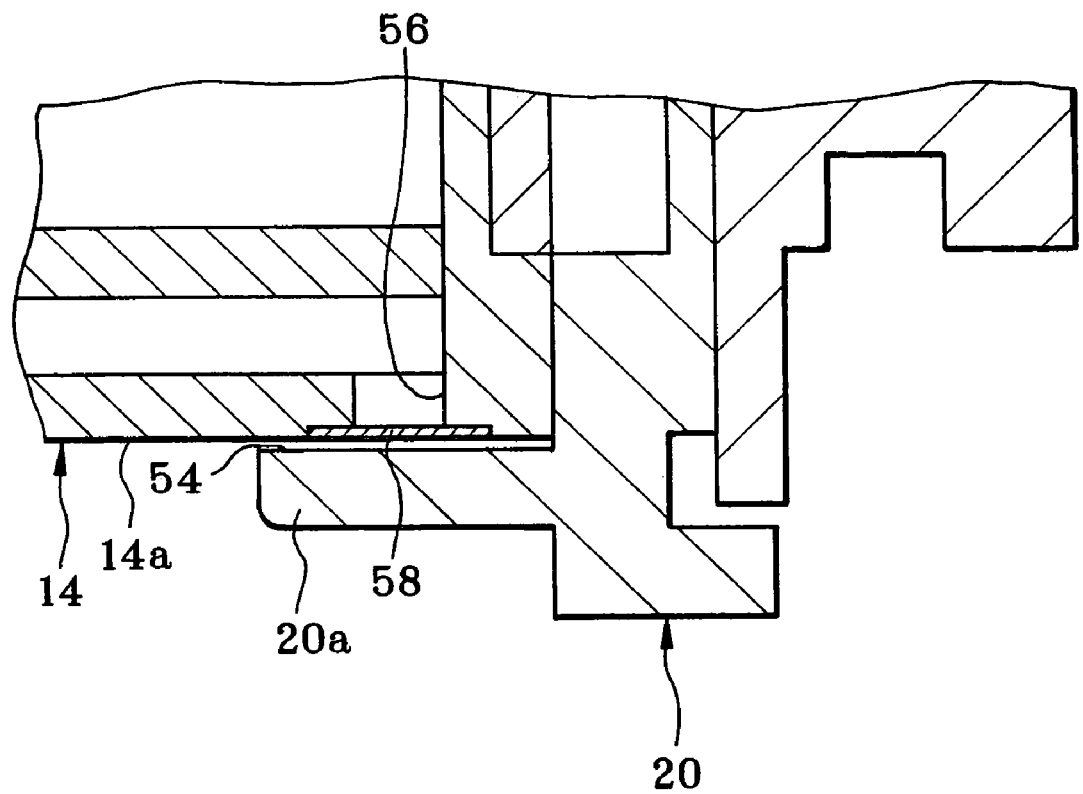
FIG. 5 is a horizontal section, partially broken, illustrating a venting structure at a rear end of an inner barrel.

In FIG. 5, a vent cover ridge 20*a* as vent cover is one portion of the ring shaped lens mount 20, and covers the large diameter sections 14*a* at the rear end of the inner barrel 14 with a predetermined width. A venting cavity 54 is defined between the vent cover ridge 20*a* and the large diameter sections 14*a*. A rear vent 56 is formed through one rear portion of the inner barrel 14 covered by the vent cover ridge 20*a*, and allows air to flow between the venting cavity 54 and the inside of the inner barrel 14. A rear filter 58 is fitted in the rear vent 56 in a closed manner, and formed from the material the same as the first filter 34. Thus, water or dust is kept by the rear filter 58 from entering the inner barrel 14 through the rear vent 56. Air is caused safely to flow into and out of the inner barrel 14 smoothly through the venting cavity 54 and the rear vent 56.

Figure 6A:
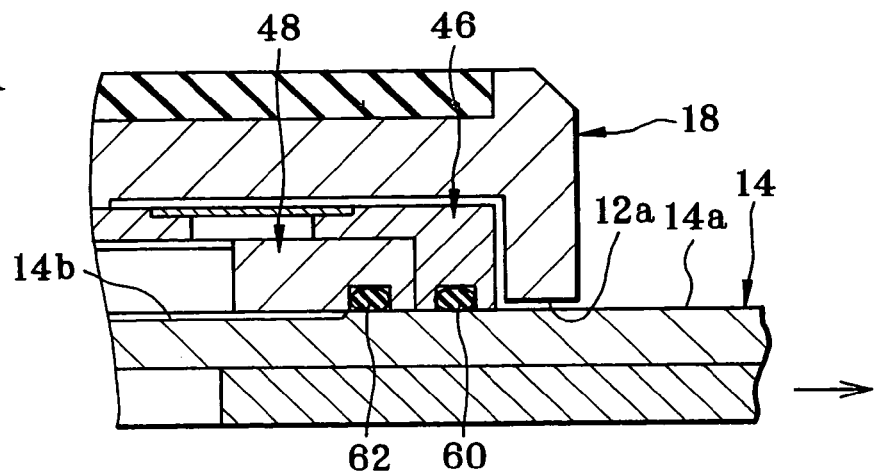
FIG. 6A is a horizontal section, partially broken, illustrating a relationship between an inner surface of the inner barrel and rubber shaped gaskets.
Figure 6B:
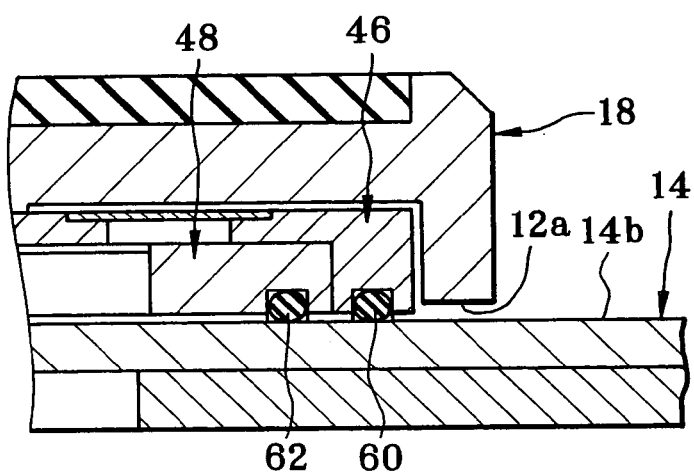
FIGS. 6B and 6C are horizontal sections, partially broken, illustrating the same as FIG. 6A but in the intermediate position and in the long size position.
Figure 6C:
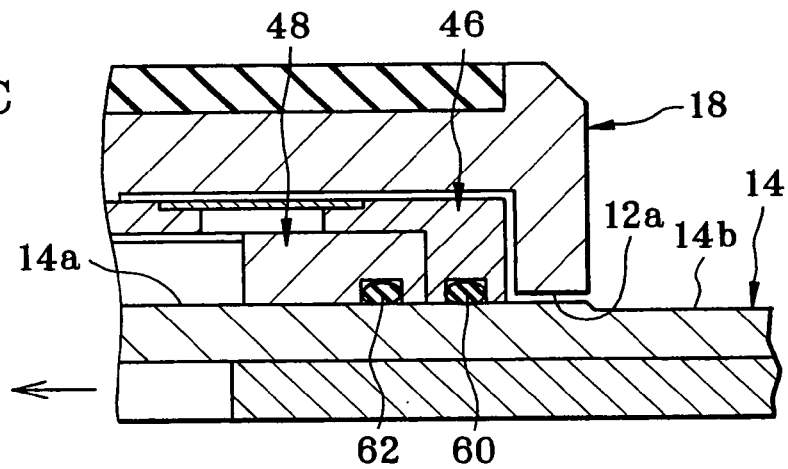

In FIG. 6, a ring shaped gasket 60 of rubber as compressible sealant element is fitted on a portion inside the outer barrel body 46 for contact with the large diameter sections 14*a* of the inner barrel 14. A ring shaped gasket 62 of rubber as compressible sealant element is fitted on a portion inside the cam barrel 48 for contact with the large diameter sections 14*a* of the inner barrel 14.

The portions or sections of the inner barrel 14 have the diameter R1 and R2 satisfying R1>R2. See FIG. 1. In the states of the short size position and long size position, inner surfaces of the ring shaped gaskets 60 and 62 tightly contact the large diameter sections 14*a* of the inner barrel 14 with the diameter R1 for sealing by compression. In the state of the intermediate position between the short size position and long size position, the ring shaped gaskets 60 and 62 are released from this compression, and lightly contact the small diameter section 14*b* of the inner barrel 14 with the diameter R2 in a manner to allow movement between the barrels.

Thus, it is possible in the short size position and long size position reliably to prevent entry of water, dust or other foreign material into the lens barrel assembly 11 through joints between the outer barrel body 46, the cam barrel 48 and the large diameter sections 14*a*. It is also possible in the intermediate position to extend or shorten the lens barrel assembly 11 smoothly with small manual force, because of reduction of adhesion and friction between the small diameter section 14*b* and inner surfaces of the ring shaped gaskets 60 and 62.

Note that in the state of the intermediate position, the degree of adhesion or sealing is reduced in relation to the large diameter sections 14*a*. However, small and sufficient tightness in the contact for preventing entry of dust or droplets is still ensured.

The operation is described. In FIG. 2, the photographing lens system 10 is not used. The lens barrel assembly 11 is shortened so the outer barrel 12 is locked about the inner barrel 14 in the short size position. A user manually unlocks the barrels, and pulls the outer barrel 12 in a direction of extension from the inner barrel 14. Then the lens barrel assembly 11 is extended as illustrated in FIG. 1, and is locked in the long size position for use. After operation of the image pickup is completed, the user manually unlocks the barrels, and pushes the outer barrel 12 toward the inner barrel 14. Again the lens barrel assembly 11 becomes shortened.

Air pressure of the inside of the lens barrel assembly 11 increases or decreases by changes in the inner volume in the course of shifting of the lens barrel assembly 11 between the short size position and long size position. So air in the lens barrel assembly 11 is caused to flow in and out through a path having the venting channel 42*a*, the venting channel 38, the first filter 34 and the first vent 32, a path having the second venting cavity portion 44, the first venting cavity portion 18*a*, the second filter 52 and the second vent 50, and a path having the venting cavity 54, the rear filter 58 and the rear vent 56. It is possible smoothly to extend or shorten the lens barrel assembly 11 because the inner air pressure of the lens barrel assembly 11 can be set equal to the atmospheric pressure of the outside.

Liquids and solids are impermeable in the filters 34, 52 and 58. The lens barrel assembly 11 can be protected even when the lens barrel assembly 11 is operated for extension or shortening, or loaded on or unloaded from a camera, in such a bad condition as in a rainy weather, and directly manually in a construction site. No misting occurs on the numerous lens elements 22–25. No influence occurs in the CCD 30 or other electric elements.

Note that a camera body (not shown) is used in connection with the lens barrel assembly 11 of the invention. A writing device (not shown) is incorporated in the camera body for writing an image signal output by the CCD 30 to a storage medium such as a memory card or the like. The photographing lens system 10 is combined with the camera body to constitute a digital still camera for image pickup of an object image.

In the above embodiment, each of the first and second vents 32 and 50, the rear vent 56, the first venting cavity portion 18*a* and the like is single. However, plural vents or cavities can be formed in each of single portions of the lens barrel assembly 11. A filter can be used for any one of those plural vents including the first and second vents 32 and 50, the rear vent 56, the first venting cavity portion 18*a* and the like is single.

In the above embodiment, air is vented through three portions which are the front of the outer barrel 12, the rear of the outer barrel 12 and the rear of the inner barrel 14. However, vents can be formed in various modified manners. For example, a vent may be formed through the outer barrel body 46 of the outer barrel 12, and a filter may be secured to this vent. Various suitable materials can be used for any of the filter of the feature of the invention in addition to the above-described Gore-Tex (trade name).

In the above embodiment, the lens barrel assembly 11 is extended or shortened between a first state for use and a second state not for use. However, the lens barrel assembly 11 of the invention can be a zoom lens barrel extended or shortened for zooming or changing a focal length. In the above embodiment, the photographing lens system 10 in the lens barrel assembly 11 is for image pickup in a digital still camera. However, the photographing lens system 10 may be for movie camera to photograph a motion picture.

A structure for venting can be used in any types of lens barrels or cameras known in the art.

Although the present invention has been fully described by way of the preferred embodiments thereof with reference to the accompanying drawings, various changes and modifications will be apparent to those having skill in this field.

Therefore, unless otherwise these changes and modifications depart from the scope of the present invention, they should be construed as included therein.

What is claimed is:

1. A lens barrel assembly comprising:

an outer barrel having a front end and a rear end;

an inner barrel, having a front portion and a rear portion, inserted in said outer barrel in an optical axis direction;

wherein said outer barrel moves forwards or backwards relative to said inner barrel in said optical axis direction, to shift between a short size position and a long size position, and when in said short size position, shifts from said inner barrel at a smallest shifting amount, and when in said long size position, shifts from said inner barrel at a largest shifting amount;

a first vent, formed in a selected one of said outer and inner barrels to be positioned in front of a remaining one thereof, and disposed close to said front end or said front portion thereof; and a first filter, being water-impermeable and air-permeable, and secured to said first vent in a closed manner.

2. A lens barrel assembly as defined in claim 1, wherein said outer barrel is movable forwards from said inner barrel, and said first vent is formed in said outer barrel, and disposed close to said front end.

3. A lens barrel assembly as defined in claim 2, further comprising a vent cover, secured to said outer barrel, for covering said first vent.

4. A lens barrel assembly as defined in claim 3, further comprising a venting channel, formed to come through a connected face between said vent cover and said outer barrel, for passing air between said first vent and outside.

5. A lens barrel assembly as defined in claim 3, further comprising:

a rotatable zoom ring disposed on one portion outside said outer barrel;

there being a venting cavity defined between said outer barrel and said zoom ring;

a second vent, formed through said outer barrel, and having one end in connection with said venting cavity;

a second filter, being water-impermeable and air-permeable, and secured to said second vent in a closed manner.

6. A lens barrel assembly as defined in claim 5, wherein said venting cavity includes:

a first venting cavity portion in connection with said second vent;

a second venting cavity portion, disposed to extend in a direction crosswise to an extending direction of said first venting cavity portion, for passing air between said first venting cavity portion and outside.

7. A lens barrel assembly as defined in claim 5, further comprising:

a third vent, formed in said inner barrel, and disposed close to said rear portion thereof; and a third filter, being water-impermeable and air-permeable, and secured to said third vent in a closed manner.

8. A lens barrel assembly as defined in claim 7, further comprising a vent cover, secured to said rear portion of said inner barrel, for covering said third vent.

9. A lens barrel assembly as defined in claim 8, wherein said vent cover is constituted by an aperture control ring or a mount ring for connection with a camera body.

10. A lens barrel assembly as defined in claim 1, further comprising a compressible sealant element secured between said outer and inner barrels.

11. A lens barrel assembly as defined in claim 10, wherein said compressible sealant element is resiliently shiftable between an initial state and a compressed state, wherein said sealant element, when said outer barrel is in at least one of said short size position and said long size position relative to said inner barrel, is shifted to said compressed state between said outer and inner barrels, for tightly closing a gap between said outer and inner barrels, and when said outer barrel is in an intermediate position between said short size position and said long size position relative to said inner barrel, is in said initial state, for allowing relative movement between said outer and inner barrels in said optical axis direction.

12. A lens barrel assembly as defined in claim 11, wherein said compressible sealant element is in a ring shape.

13. A lens barrel assembly as defined in claim 11, wherein said inner barrel includes:

a small diameter section, disposed to extend between said rear portion and said front portion, having a peripheral surface with a first diameter, and associated with said intermediate position;

a large diameter section, disposed close to at least one of said rear portion and said front portion, having a peripheral surface with a second diameter larger than said first diameter, associated with at least one of said short size position and said long size position, for compressing said sealant element in contact with said outer barrel.

14. A lens barrel assembly as defined in claim 1, wherein said inner barrel has a solid state pickup device incorporated therein.

* * * * *